United States Patent [19]
Johnson

[11] 3,888,287
[45] June 10, 1975

[54] BLADE FOR TREE SHEAR HAVING VERTICALLY SWINGABLE BLADE SUPPORT ARMS

[75] Inventor: Earl Clinton Johnson, Bellevue, Iowa

[73] Assignee: Deere & Company, Moline, Ill.

[22] Filed: Apr. 10, 1974

[21] Appl. No.: 459,538

[52] U.S. Cl. .............................. 144/34 E; 144/3 D
[51] Int. Cl. ........................................... A01q 23/08
[58] Field of Search .......... 144/2 Z, 3 D, 3 R, 34 R, 144/34 E, 309 AC

[56] References Cited
UNITED STATES PATENTS

| | | | |
|---|---|---|---|
| 3,461,929 | 8/1969 | Hunger et al. | 144/2 Z |
| 3,540,501 | 11/1970 | Jonsson | 144/34 E |
| 3,808,909 | 5/1974 | Johnson | 144/34 E X |
| 3,817,303 | 6/1974 | Kantola et al. | 144/34 R |
| 3,826,295 | 7/1974 | Johnson | 144/34 E |

*Primary Examiner*—Andrew R. Juhasz
*Assistant Examiner*—W. D. Bray

[57] ABSTRACT

Provided is a tree shear head of a type including a main frame to which a pair of blade support arms are attached for pivotal movement about an axis orientated so as to extend generally perpendicular to a tree being cut. A pair of arcuate platelike blades are respectively fixed to the arms, the respective curvatures of the blades being such that the blades lie along the respective paths that they trace about the pivot axis of the arms during operation. The blades have respective cutting edges extending parallel to the pivot axis of the arms and are movable with the arms between an open position, wherein the cutting edges are spaced apart for receiving a tree to be sheared therebetween and a closed position, wherein the blades are slightly overlapped. Relative to the pivot axis of the blade support arms, the cutting edge of each of the blades is formed by inner and outer converging planar surfaces which respectively extend outwardly and inwardly from inner and outer parallel arcuate surfaces of the blade. The inner and outer plananr surfaces of each blade are dimensioned such that the area of the inner planar surface is less than the area of the outer planar surface, the planar surfaces being so angled relative to a radius line emanating from the center of curvature of the blades that as the cutting edge advances to a position between the open and closed positions thereof during shearing of a standing tree, the vertical reacting forces exerted on the blade will be balanced.

4 Claims, 9 Drawing Figures

FIG. I

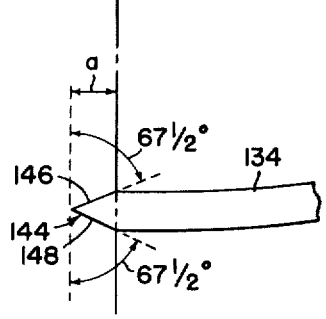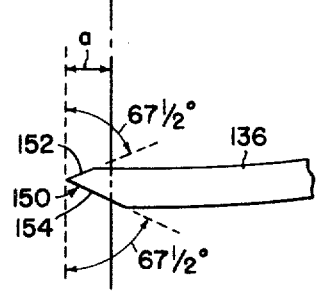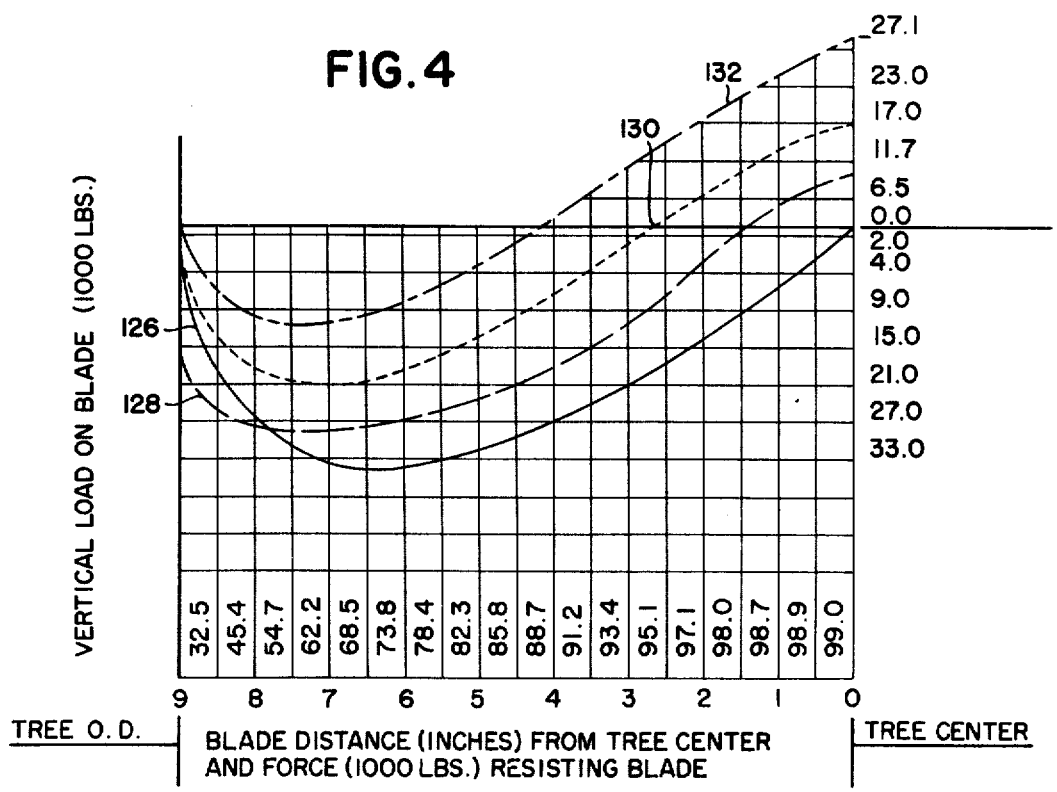

BLADE FOR TREE SHEAR HAVING VERTICALLY SWINGABLE BLADE SUPPORT ARMS

BACKGROUND OF THE INVENTION

The present invention relates to a blade for a tree shear and more particularly relates to a blade for a tree shear of the type having blade support arms which are mounted for swinging movement about an axis oriented such that it traverses the length of a tree being sheared.

Trees are now commonly sheared by forcing flat blades through a tree along paths which are vertical to the grain or length of a tree. Not only does such shearing require a large powering force for moving the blades through a tree, but such shearing causes butt damage to the tree resulting in the loss of valuable wood for lumber.

Attempts have been made to design shears which overcome the above-mentioned problems with the shears now commonly in use, however, these shears have not been entirely satisfactory. Specifically, examples of shears designed to move blade cutting edges through a tree on a path slanted to the grain or length of the tree throughout a substantial portion of the movement of the blade are disclosed in U.S. Pat. No. 3,540,501, granted to Jonsson on Nov. 17, 1970 and in co-pending U.S. Pat. application, Ser. No. 354,480 filed on Apr. 26, 1973 now U.S. Pat. No. 3,826,295 by Johnson, et al., and assigned to Deere and Company, as is the present application.

The tree shear disclosed in the above-identified Jonsson patent includes a pair of spherically curved blades mounted on respective arms which are in turn mounted for swinging movement about an axis which is oriented so as to make an acute angle with a plane extending perpendicular to the length of a tree being sheared; and the tree shear disclosed in the above-identified Johnson et al application includes a pair of cylindrically curved blades mounted on respective arms which are in turn mounted for swinging movement about an axis which is oriented so as to be perpendicular to the length of a tree being sheared. The curvatures of the blades of these shears are such that the blades lie in respective paths expected to be traced by their cutting edges as the blades move into a tree during shearing of the latter. However, it has been found that the curvatures of these blades and the configuration of their leading edges have resulted in reactive forces being imparted to the blades which tend to move the blades out of their intended path of movement in a direction away from the axis about which the intended paths extend. These reactive forces are often quite high, resulting in damage to the blades or other parts of the shear. Also, if the blades are forced to move out of their intended paths of movement, the power requirement for shearing a tree is increased greatly. Heretofore, the factors which contributed to these reactive forces were not identified to the extent that curved shear blades could be constructed in a manner which would overcome the above-noted problems.

SUMMARY OF THE INVENTION

According to the present invention, there is provided a novel shear blade for use with a tree shear of the type including a pair of arcuate blades respectively mounted on a pair of blade support arms which are swingable about an axis which extends generally perpendicular to a tree being sheared.

An important feature of the invention resides in the provision of an arcuate blade which is so designed that forces experienced by the blade in a direction transverse thereto, during cutting, are maintained at relatively low values. More specifically, a feature of the invention resides in the provision of an arcuate cutting blade having a cutting edge formed by converging planar surfaces respectively located inwardly and outwardly relative to the axis of swinging movement of the blade, the inner planar surface having an area which is lesser than the area of the outer planar surface and the surfaces being so angled relative to each other that as the blade moves through a tree, the transverse forces reacting on the inner and outer surfaces of the blade will become balanced at some point prior to the cutting edge of the blade reaching the center of the tree.

Yet another specific feature of the invention resides in the provision of a cutting blade designed for cutting trees up to 18 inches in diameter, the blades being curved at a radius of about 24 inches and the ratio of the area of the inner planar surface to the area of the outer planar surface being approximately 3/10 and the angle included at the intersection of the inner and outer planar surfaces being approximately 50°.

These and other objects will become apparent from a reading of the following description taken together with the appended drawings.

BRIEF DESCRIPTION OF THE DRAWINGS

FIG. 4 is a graph showing the results of a computer computation of the vertical forces expected to act on four different constructions of shear blades as the latter progress from the outside diameter to the center of an 18 inch diameter tree being sheared.

FIGS. 5–8 are end views of the beveled cutting edges of the blade constructions used in the computer computations, which are reflected in the graph illustrated in FIG. 4.

DESCRIPTION OF THE PREFERRED EMBODIMENT

Figure 1:
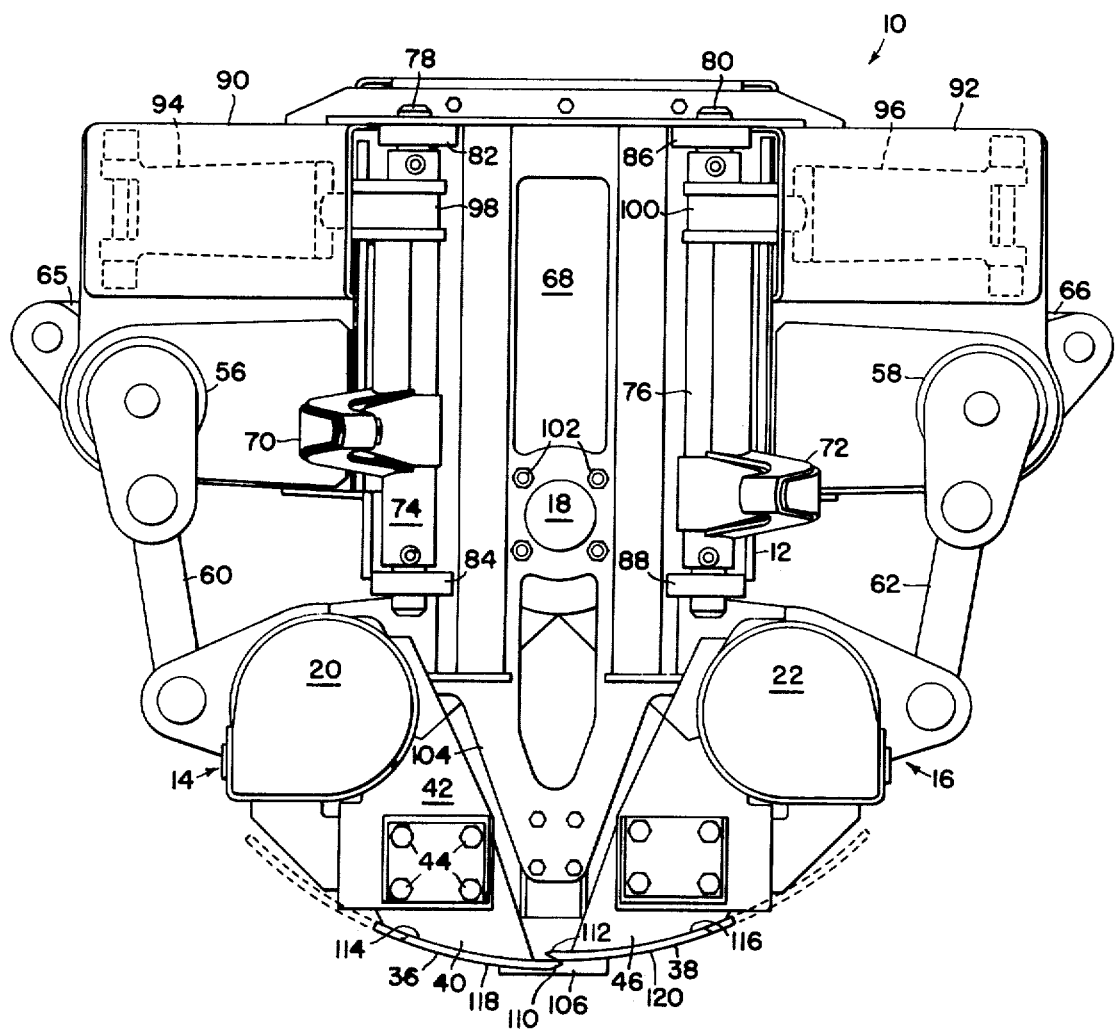
FIG. 1 is a front elevational view of a tree shear head embodying shear blades constructed according to the principles of the present invention.

Referring now to FIG. 1, therein is shown a tree shear head constructed according to the present invention and indicated in its entirety by the reference numeral 10. The shear head 10 includes a main frame 12 on which right and left blade support arms 14 and 16, respectively, are pivotally supported through means of a horizontal, fore-and-aft extending pivot pin 18 located centrally between the opposite sides of and generally midway between the top and bottom of the frame 12. The blade support arms 14 and 16 respectively include substantially cylindrical tubular sections 20 and 22 located to the right- and left-hand sides of the frame 12 and extending alongside and forwardly of the frame. Projecting perpendicular to the right tubular section 20 and having first ends respectively welded at spaced locations along the rear portions of the tubular sections 20 are front, intermediate and rear flat arm sections 24, 26 and 28, respectively, the opposite ends of the arm sections being journaled for rotation on the pivot pin 18. Similarly, extending perpendicular to and having first ends respectively welded to the left tubular section 22 at spaced locations along the rear portion thereof are front, intermediate and rear flat arms sections 30, 32 and 34, respectively, the arm sections having their opposite ends journaled on the pivot pin 18. Respectively secured to the lower forward portions of the right and left rear arm sections 20 and 22 are right and left blades 36 and 38, respectively. The blades 36 and 38 are each constructed of relatively thin plates which are cylindrically curved so as to respectively lie on fixed radii emanating from the axis of the pivot pin 18. For the purpose of securing the right blade 36 to the right tubular section 20, the upper surface of the blade is provided with front and rear connection structures which are received in complementary front and rear angle bracket structures, only the front connection and bracket structures being shown at 40 and 42. The front and rear connection structures are secured to the angle bracket structures through means of a plurality of bolts 44. Similarly, connection of the left blade 38 with the left tubular section 22 is made through means of front and rear connection structures 46 and 48, respectively, which are fixed to the upper surface of the left blade and respectively received in complementary shaped front and rear connection brackets 50 and 52, respectively fixed to the left tubular section 22. A plurality of bolts 54 respectively secure the front and rear connection structures 46 and 48 to the front and rear connection brackets 50 and 52. Thus, it will be appreciated that the blades 36 and 38 may be moved towards and away from each other by swinging the blade support arms 14 and 16 about the pivot pin 18.

For the purpose of selectively swinging the blade support arms 14 and 16 about the pivot pin 18, there is provided a powering mechanism comprising right and left crankshafts 56 and 58, respectively, rotatably mounted in the opposite sides of the frame 12 at respective locations located slightly above and equidistant from the pivot pin 18. Right and left links 60 and 62, respectively, are connected between the right crankshaft 56 and the right blade support arm 14, and between the left crankshaft 58 and the left blade support arm 16. Located between the crankshafts 56 and 58 in a transversely extending actuator housing 64 formed by the upper portion of the frame 12 is a hydraulic actuator including a cylinder (not shown) having oppositely extending left and right piston rods 65 and 66 extending therefrom and being respectively pivotally connected to the crankshafts 56 and 58. The hydraulic actuator includes a structure (not shown) by which the piston rods 65 and 66 are selectively simultaneously extendible and retractable so as to effect simultaneous rotation of the crankshafts and simultaneous movement of the blade support arms 14 and 16 through means of the links 60 and 62.

The frame 12 includes a structure on its forward side which defines tree-engaging surface means 68 located centrally between the crankshafts 56 and 58 and adapted for engaging the trunk of a tree when the tree shear head is properly positioned on the tree for shearing the same. For the purpose of grasping the trunk of a standing tree and bringing the tree-engaging surface means 68 against the tree trunk, there is provided right and left grapple arms or tongs 70 and 72, respectively.

The tongs 70 and 72 are respectively formed integrally with vertically disposed tubular members 74 and 76 which are respectively fixed to shafts 78 and 80 which are respectively received in the tubular members and which in turn are respectively rotatably mounted in left and right pairs of upper and lower ears 82 and 84, and 86 and 88 respectively fixed to the frame 12. The upper, right and left front portions of the frame 12 are respectively constructed so as to define right and left actuator housings 90 and 92, respectively. Right and left hydraulic actuators 94 and 96 are respectively received in and pivotally mounted to the housings 90 and 92 and have respective piston rods 98 and 100 projecting inwardly and pivotally connected to respective lugs integral with the tubular members 74 and 76. The actuators 94 and 96 are simultaneously extendible and retractable to respectively swing the tongs 70 and 72 towards and away from each other.

Fixed to the forward side of the frame 12 so as to be in a circular arrangement coaxial with the pivot pin 18 are a plurality of forwardly projecting spikes 102. The spikes 102 aid in reducing unbalanced cutting forces in the shear head by maintaining the shear head in place once the grapple tongs 70 and 72 are closed, it being noted that such closing will act to impale and keep a tree trunk in place on the spikes.

Figure 2:
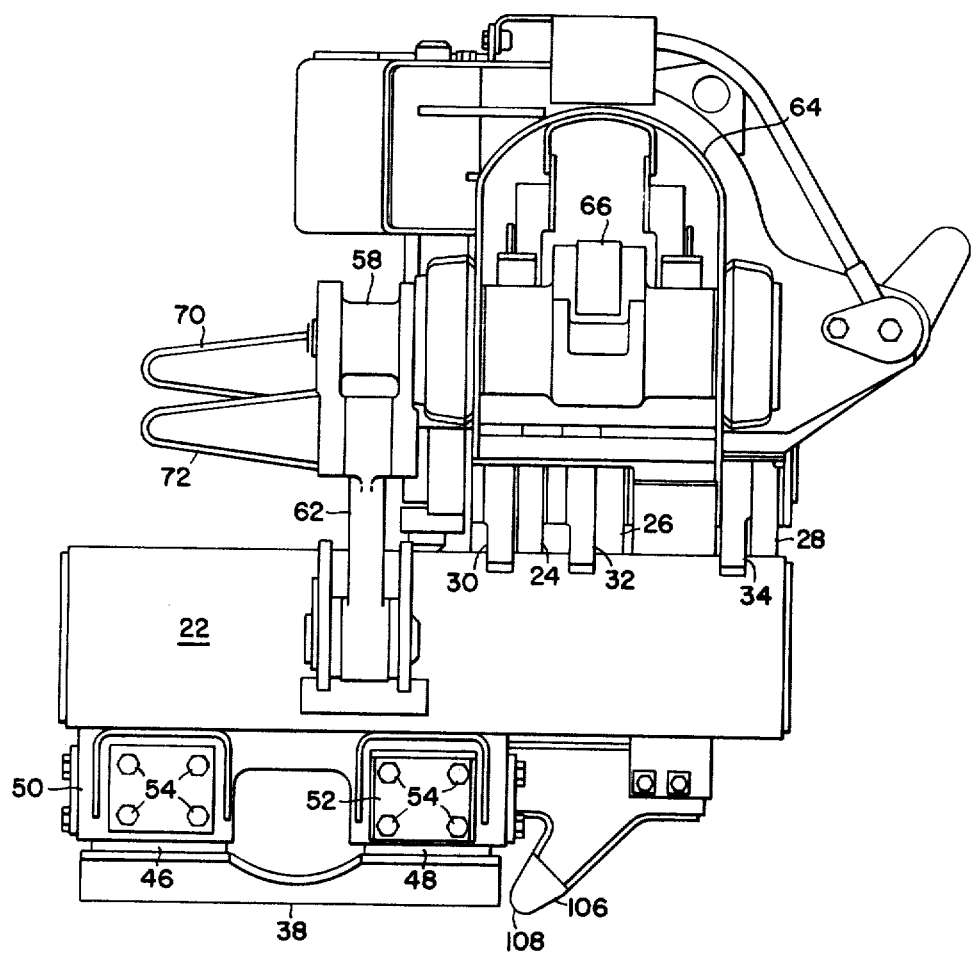
FIG. 2 is a side elevational view of the tree shear shown in FIG. 1.
Figure 7:
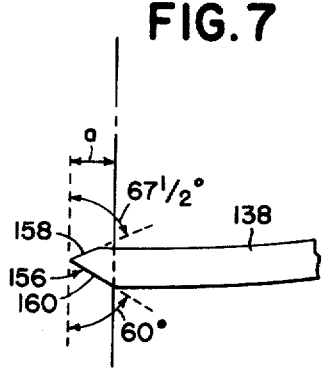

As viewed from the front as it appears in FIG. 1, the frame 12 includes a lower frame structure 104 extending downwardly from the vicinity of the pivot pin 18 and having opposite sides which converge inwardly to a bottom end 106 of the frame. As viewed from the side as appears in FIG. 2, the bottom end 126 of the frame 12 projects forwardly to a tip 108 that is located just rearwardly and below the level of the cutting blades 36 and 38 when the latter are closed.

Turning now to a more detailed description of the blades 36 and 38, in FIG. 1, these blades are illustrated in solid lines in a closed position, wherein respective beveled cutting edges 110 and 112 of the blades 36 and 38 are overlapped; and the blades are shown in dashed lines in an open position wherein the cutting edges 110 and 112 are spaced apart a distance slightly greater than the diameter of the largest tree that the shear is designed to sever. The right and left blades 36 and 38 respectively include inner arcuate surfaces 114 and 116 and outer arcuate surfaces 118 and 120, as considered relative to the axis of the pivot pin 18. The inner arcuate surfaces 114 and 116 are respectively parallel to the outer arcuate surfaces 118 and 120 and in order for the blades to assume the overlapped closed position, shown in FIG. 1, the right blade 36 is disposed from the axis of the pin 18 a distance equal to the thickness of the blades, greater than the blade 38. For example, in a shear for severing trees up to 18 inches in diameter, the blades 36 and 38 might be ½ inch thick and the inner surface 116 of the left blade 36 might be located at a distance of approximately 24 inches from the pivot pin 18, the inner surface 114 of the right blade 36 then being located at a distance of about 24.5 inches from the axis of the pivot pin 18. The right and left arms 14 and 16 are of course dimensioned so as to maintain the cutting blades on respective cutting paths which correspond to the curvatures of the blades 36 and 38.

Figure 3:
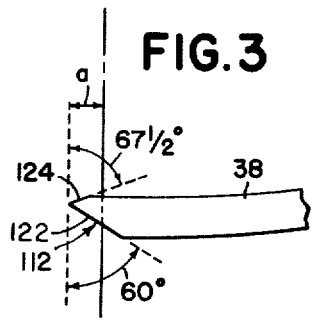
FIG. 3 is an enlarged view of one of the blades shown in FIG. 1.

The present invention resides in the beveled edges 110 and 112 of the blades 36 and 38 and since the beveled edge construction of the blades are similar, only the details of the cutting edge 112 of the blade 38 are shown in FIG. 3. Referring then to FIG. 3, it can be seen that the cutting edge is formed by converging inner and outer planar surfaces 122 and 124. Significant is the fact that the inner planar surface 122 has an area which is substantially less than the area of the outer planar surface 124. This difference in surface area comes into play when the shear blade is cutting a tree since the reactive forces of the stump of the tree will be acting against a greater surface area than the surface area against which the reactive forces of the butt of the tree act, the difference in surface area being such that, with reference to shearing a tree standing vertically, the total vertical force acting on the blade goes from a downward force at the initial part of the shearing operation as the blade moves from the outside of the tree towards its center and then reverses to a vertically upwardly directed force prior to the cutting edge reaching the center of the tree. In the preferred embodiment, the ratio of the area of the inner surface to the area of the outer surface is approximately 0.3 and the inner planar surface 122 is disposed such that it makes an angle of approximately 67½° with a radius line emanating from the pivot axis 18 while the outer planar surface 124 makes an angle of 60° with the radius line.

Variables found to influence the transverse forces which an arcuate blade of a given curvature will experience during shearing are the angle of attack of the blade relative to the grain of a tree, the distance that the blade has travelled into a tree and the particular configuration of the bevelled cutting edge.

Referring now to FIG. 4, therein is shown a graph of results obtained through a computer computation of the vertical force expected to be experienced by four cutting blades during the movement of the latter through an 18-inch diameter, vertically standing tree, the blades being constructed similarly to blades 36 and 38 but differing in that they have different beveled cutting edge constructions. Specifically, curves 126, 128, 130 and 132 respectively relate to cutting blades 134, 136, 138 and 140 respectively illustrated in FIGS. 5, 6, 7 and 8. The blade 134 includes a beveled cutting edge 144 comprising inner and outer converging planar surfaces 146 and 148, the latter both making angles of approximately 67½° with a radius line emanating from the center of curvature of the blade 134 and meeting at a fixed distance from the radius line. The areas of the surfaces 146 and 148 are equal and from inspecting the curve 126, it can be seen that the vertical force acting on the inner surface 146 is not balanced by the vertical force acting on the outer surface 148 until the cutting edge reaches the tree center. Further, it can be seen that when the blade 134 has progressed approximately 3½ inches into the tree, it will experience a maximum unbalanced downward vertical force of about 34,000 lbs.

The blade 136 includes a beveled cutting edge 150 formed by converging inner and outer planar surfaces 152 and 154. Like the surfaces 146 and 148 of the blade 136, the surfaces 152 and 154 of the blade 136 make respective angles of approximately 67½° with a radius line emanating from the center of curvature of the blade 136. However, the surfaces 152 and 154 are respectively made smaller and larger than the corresponding surfaces 146 and 148 of the blade 134 and the surface area of the inner planar surface 152 is only about 0.5 of the surface area of the outer planar surface 154. An inspection of curve 128 of the graph shows that the maximum vertical force expected to be experienced by a blade of this construction is about 29,000 lbs. downwardly, which is an appreciable decrease from the vertical force expected to be experienced by the blade 134, this force occuring approximately when the cutting edge has progress 1½ inches into the tree. Also, it can be seen that a force reversal occurs in the blade 136 when the cutting edge 150 thereof reaches a location approximately 1½ inches from the tree center.

The blade 138 includes a beveled cutting edge 156 comprising converging inner and outer planar surfaces 158 and 160. Here the area of the inner planar surface 158 is the same as the area of the outer planar surface 152 of the blade 136. However, the area of the outer planar surface 160 has been decreased from that of the outer planar surface 154 of the blade 136 such that the ratio of the area of the inner planar surface 158 to the outer planar surface 160 is about 0.67; and instead of making an angle of 67½° with a radius emanating from the center of curvature of the blade 136, the angle that the outer planar surface makes with the radius is approximately 60°. An inspection of the curve 130 shows that the maximum total vertical force that the blade 140 is expected to experience is approximately 20,000 lbs., when the cutting edge 156 reaches a location about 2 inches into the tree, this force being approximately 9,000 lbs. less than the maximum force to which it is expected that the blade 138 would be subjected. Also, it can be seen that a reversal in the force acting on the blade does not occur until the blade has reached a point somewhere between 2½ and 3 inches from the center of the tree.

The blade 140 includes a beveled cutting edge 162 comprising converging inner and outer planar surfaces 164 and 166. The inner and outer surfaces 164 and 166 are respectively angled similarly to the surfaces 158 and 160 of the blade 138, however, the size of the surface 164 has been decreased and the size of the surface 166 has been increased such that ratio of the area of the inner surface to the outer surface is approximately 0.43. It can be seen by inspecting the curve 132 that the maximum downward force expected to be experienced by the blade is approximately 14,000 lbs. occurring approximately 1½ inches into the tree and the maximum upward force to which the blade is expected to be subjected is approximately 27,000 lbs. at a location about ½ inch from the center of the tree. The force reversal occurs at a location approximately 4½ inches from the center of the tree.

Experience has shown that average sized trees will be in the neighborhood of about 12 to 14 inches in diameter rather than the maximum of 18 inches for which the tree shear head is designed.

Figure 9:
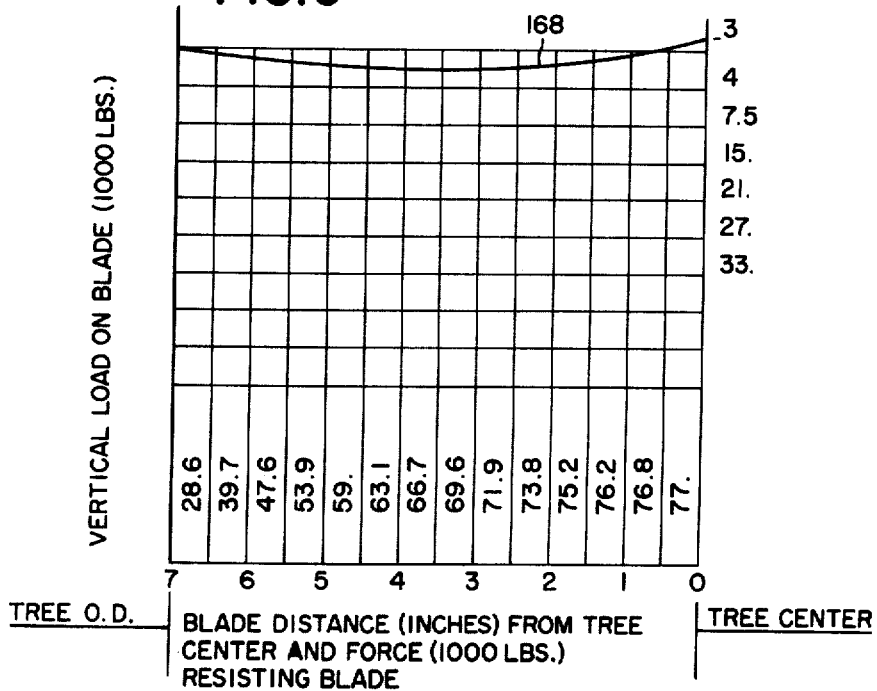
FIG. 9 is a graph of part of the results shown in FIG. 4 projected to relate to a 14-inch diameter tree.

Accordingly, the information of curve 132 was projected so as to relate to a 14-inch diameter tree, this projected information being used to construct a curve 168 appearing on the graph illustrated in FIG. 9. In this projection, it was assumed that the slope of the curve 168 at the 7-inches from center point would be equal to the slope of the curve 132 at the 7-inches from center point thereof and that a force reversal would occur at approximately the same magnitude of tree resistance. Thus, an inspection of the curve 168 will reveal that the shear blade 140 is expected to experience a maximum downward force of about 1,000 lbs. when the cutting edge 162 reaches a location about 3½ inches from the tree center of a 14-inch diameter tree and that just prior to the cutting edge reaching the tree center, the blade will experience a maximum upward force of about 3,000 lbs. Also, a force reversal occurs at a point about 1 inch from the tree center.

Figure 8:
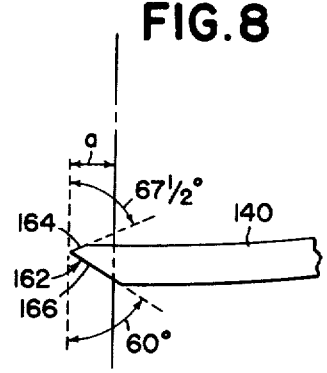

The curves on the graph illustrated in FIG. 8 thus show that the configuration of the cutting edge of a curved blade contributes significantly to the vertical forces that the blade will experience when shearing a vertically standing tree. Further, the curves show that it is desirable to have the inner bevel surface be of an area which is smaller than the area of the outer surface in order to overcome the natural tendency of the blade to be drawn downwardly in the tree. While blade configurations used in the computer computations all have inner bevel surfaces which make angles of 22½° with a radius line emanating from the center of curvature of the blades, this particular angle is only used for illustrative purposes and is not to be considered critical.

The cutting edges of the blades 36 and 38 are configured more similar to those of the blade 140 than any other of the blades. This selection of a cutting edge was made even though the curve 168 indicates that the blades will undergo a force reversal even during shearing a 14-inch diameter tree, since in practice the connection structures for mounting the blades 36 and 38 on the arms 14 and 16 are welded to the blades and this welding causes the blades to become slightly warped in the upward direction to the extent that the unbalanced upward force appearing on the curve 168 is approximately that which would be required to straighten the warp out of the blades. Accordingly, the blades 36 and 38 are designed so as to go through a minimum of deflection cycles in a scattering of random wood cuts so as to increase the lift of the blades.

It is thought that the operation of the blades 36 and 38 is made clear from the foregoing description and for the sake of brevity, no further description of the operation is given.

I claim:

1. In a tree shear head of a type including a main support frame, a pair of blade support arms pivotally mounted on the frame for pivotal movement about an axis which extends horizontally when the frame is in an upright position, a pair of plate-like shear blades respectively fixed to the pair of support arms and being curved so as to be on respective radii emanating from said axis, said blades having respective beveled cutting edges which extend parallel to said axis and which are movable with said blade arms between an open position, wherein they are spread apart a distance slightly greater than the diameter of the largest tree to be severed, and a closed position wherein they are slightly overlapped, power-operated means connected to the blade support arms for swinging them towards and away from each other; and each of said blades, with reference to said axis, including inner and outer curved surfaces located on respective radii emanating from said axis with said cutting edge being formed by converging inner and outer planar surfaces respectively extending outwardly and inwardly from said inner and outer curved surfaces, the improvement comprising: the ratio of the area of the inner planar surface to the area of the outer planar surface being no greater than about 0.5 and the included angle formed at the intersection of the inner and outer planar surfaces of each blade being no less than about 45°.

2. The tree shear head defined in claim 1 wherein said inner planar surface has an area which is between about 0.15 and 0.5 of the area of said outer planar surface and wherein the included angle formed by the inner and outer planar surfaces is between about 45° and 52½°.

3. In a tree shear blade of an arcuately curved type including a beveled cutting edge formed by first and second sides respectively converging from concave and convex surfaces of the blade, the blade being adapted for movement along a path corresponding to its curvature and oriented such that during severing of a standing tree the concave and convex surfaces respectively face upwardly and downwardly in and the blade moves downwardly and inwardly towards the center of the tree, the improvement comprising: said first side having a surface area which is no more than about one-half the area of said second side.

4. The tree shear blade defined in claim 3 wherein said side of the cutting edge which is adapted to face upwardly makes an angle of about 22½° with a radius line emanating from the center of curvature of the blade; and said side of the cutting edge which is adapted to face downwardly making an angle with the radius line in the range from about 22½° to about 30°.

* * * * *